United States Patent
Kördel et al.

(10) Patent No.: US 11,307,022 B2
(45) Date of Patent: Apr. 19, 2022

(54) 3-D MEASUREMENT OF FEATURES, INCLUDING CUT-OUTS AND/OR GROOVES

(71) Applicant: Siemens Aktiengesellschaft, Munich (DE)

(72) Inventors: Martin Kördel, Charlotte, NC (US); Helmuth Euler, Glonn (DE); Anton Schick, Velden (DE); Wolfgang Heine, Unterhaching (DE); Werner Gergen, Aschheim (DE); Uwe Philippi, Bruckmühl (DE)

(73) Assignee: SIEMENS ENERGY GLOBAL GMBH & CO. KG, Munich (DE)

( * ) Notice: Subject to any disclaimer, the term of this patent is extended or adjusted under 35 U.S.C. 154(b) by 301 days.

(21) Appl. No.: 16/089,257

(22) PCT Filed: Dec. 7, 2016

(86) PCT No.: PCT/EP2016/080093
§ 371 (c)(1),
(2) Date: Sep. 27, 2018

(87) PCT Pub. No.: WO2017/167413
PCT Pub. Date: Oct. 5, 2017

(65) Prior Publication Data
US 2019/0120614 A1    Apr. 25, 2019

(30) Foreign Application Priority Data
Mar. 30, 2016 (DE) .................... 10 2016 205 217.9

(51) Int. Cl.
*G01B 11/24* (2006.01)
*G01B 21/04* (2006.01)
(Continued)

(52) U.S. Cl.
CPC .............. *G01B 11/24* (2013.01); *F01D 5/303* (2013.01); *F01D 25/285* (2013.01);
(Continued)

(58) Field of Classification Search
CPC .... G01B 11/24; G01B 21/047; G01B 5/0002; F01D 25/285; F01D 5/303; F05D 2250/294
See application file for complete search history.

(56) References Cited

U.S. PATENT DOCUMENTS 4,960,285 A * 10/1990 Doi ................... B23B 31/16283
                                                    279/123
5,019,129 A *  5/1991 Johanson ............. B23H 11/003
                                                    269/136
(Continued)

FOREIGN PATENT DOCUMENTS

EP   1 416 122 A2   5/2004   ............. F01D 21/00
EP     1568439 A1   8/2005   ................ B23P 6/00
(Continued)

OTHER PUBLICATIONS

JPH0581122U, 1992, Espacenet English Translation, downloaded from the Internet on Aug. 19, 2021 (Year: 1992).*
(Continued)

*Primary Examiner* — Alexander Satanovsky
*Assistant Examiner* — Lyudmila Zaykova-Feldman
(74) *Attorney, Agent, or Firm* — Slayden Grubert Beard PLLC

(57) ABSTRACT

Various embodiments may include a measuring device for three-dimensionally sensing elongate cut-outs comprising: an assembly for positioning and fixing on an elongate cut-out of a body; and a 3-D measuring head connectable to the assembly to be aligned with the elongate cut-out for the respective 3-D surface measurement of the elongate cut-out.

8 Claims, 4 Drawing Sheets

(51) Int. Cl.
*F01D 25/28* (2006.01)
*F01D 5/30* (2006.01)
*G01B 5/00* (2006.01)

(52) U.S. Cl.
CPC ......... *G01B 5/0002* (2013.01); *G01B 21/047* (2013.01); *F05D 2250/294* (2013.01)

(56) References Cited

U.S. PATENT DOCUMENTS

| | | | | |
|---|---|---|---|---|
| 5,186,157 | A * | 2/1993 | Bieri | B23Q 1/26 125/13.01 |
| 8,152,419 | B1 * | 4/2012 | Snyder | B23B 47/281 408/105 |
| 2004/0083801 | A1 * | 5/2004 | Smith | F01D 25/285 73/116.03 |
| 2010/0300173 | A1 * | 12/2010 | Mock | B21J 9/06 72/316 |
| 2015/0308813 | A1 | 10/2015 | Morrissey et al. | 356/612 |
| 2016/0184942 | A1 * | 6/2016 | Rattunde | B25B 1/2478 29/559 |
| 2020/0001341 | A1 * | 1/2020 | Berghaus | B21D 41/04 |

FOREIGN PATENT DOCUMENTS

| | | | | |
|---|---|---|---|---|
| JP | H0581122 U | * | 11/1993 | |
| WO | 2012/069154 A1 | | 5/2012 | ............. E21B 19/16 |
| WO | 2015/014652 A1 | | 2/2015 | ............. G01B 11/25 |
| WO | 2017/167413 A1 | | 10/2017 | ............. F01D 21/00 |

OTHER PUBLICATIONS

International Search Report and Written Opinion, Application No. PCT/EP2016/080093, 20 pages, dated Mar. 13, 2017.
Sick AG, "Smart Camera IVC-3D," URL:https://www.sick.com/media/dox/6/56/756/Product_information_Smart_Kamera_1VC_3D_de_1M0015756.PDF, 6 pages, Mar. 1, 2010.
Micro Epsilon GmbH, "Gap Measurement by Laser Scanner," URL: http://www.micro-epsilon.de/press/release/PR225_gapCONTROL, 1 page, May 25, 2011.
Micro-Epsilon GmbH: "Instruction Manual gapCONTROL 2711," URL: http://www.micro-epsilon. de/download/manuals/man--gapCONTROL-2711--de.pdf, 66 pages, 2015.
"New gapCONTROL SetUp Software 2.1" Micro-Epsilon GmbH, URL: http://www.micro-epsilon.de/news/2015/2015-03-24_gapCONTROL/, 2 pages, Mar. 24, 2015.
"New Monorail Generation of Roller Guideways," Schneeberger, URL: https://www.schneeberger.com/de/news/neuigkeiten/details/article/neue-generation-der-monorailrollenfuehrung/, 2 pages, 2017.
GOM GmbH: "GOM Inspect Accurate Industrial 3D Metrology," URL: http://www.gom-inspect.com/de/overview.phpm, 6 pages, 2017.
German Search Report, Application No. 102016205217.9, 11 pages, Mar. 27, 2017.
Micro-Epsilon GmbH: "3D-View: Interactive 3D Visualization Software," URL: http://www.micro-epsilon.de/2D_3D/laser-scanner/Software/scanCONTROL-3D-View/, 1 page, Retrieved on Feb. 1, 2019.
European Office Action, Application No. 16812706.6, 7 pages, dated Mar. 1, 2021.

* cited by examiner

3-D MEASUREMENT OF FEATURES, INCLUDING CUT-OUTS AND/OR GROOVES

CROSS-REFERENCE TO RELATED APPLICATIONS

This application is a U.S. National Stage Application of International Application No. PCT/EP2016/080093 filed Dec. 7, 2016, which designates the United States of America, and claims priority to DE Application No. 10 2016 205 217.9 filed Mar. 30, 2016, the contents of which are hereby incorporated by reference in their entirety.

TECHNICAL FIELD

The present disclosure relates to measurements. Various embodiments may include a 3-D measuring device and/or a method for three-dimensionally sensing elongate cut-outs, in particular grooves, in particular rotor grooves.

BACKGROUND

During servicing work, optical inspection and 3-D measurement of elongate cut-outs, in particular grooves, in particular gas turbine rotor grooves, are necessary, wherein in particular straight groove profiles must be ensured. In continuous operation, grooves are subject to wear and deformation, which can lead to the seating of turbine blades loosening and, in the extreme case, to a turbine being destroyed. Conventionally, a partial imprint of elongate cut-outs, in particular grooves, is taken by means of a dental impression compound and then measured by means of profile projectors.

SUMMARY

The teachings of the present disclosure may be embodied in a 3-D measuring device and/or a method for three-dimensionally sensing elongate cut-outs, in particular grooves, in particular rotor grooves, in such a way that inspection and three-dimensional (3-D) measurement of elongate cut-outs, in particular grooves, in particular their straight profiles, can be performed simply, effectively, safely, repeatably and reliably. A cut-out is in particular a three-dimensional region of a material body in which there is no material of the body.

As an example, some embodiments may include a 3-D measuring device (M) for three-dimensionally sensing elongate cut-outs, in particular grooves, in particular rotor grooves, characterized by an assembly (1) for positioning and fixing on an elongate cut-out of a body, in particular a rotor; and a 3-D measuring head (3) that can be connected to the assembly and aligned with the elongate cut-out for the respective 3-D surface measurement of the elongate cut-out.

In some embodiments, there is a computer device for the processing and 3-D reconstruction of the 3-D data of the elongate cut-out generated by means of the 3-D measuring head to form a 3-D model of the elongate cut-out.

In some embodiments, the computer device performs the analysis of the 3-D measured data by means of comparing the 3-D model with a CAD (computer-admitted-design) model of the elongate cut-out.

As another example, some embodiments may include a method for three-dimensionally sensing elongate cut-outs, in particular grooves, in particular rotor grooves, characterized by (S0) positioning and fixing an assembly on an elongate cut-out of a body, in particular a rotor; (S1) connecting and aligning a 3-D measuring head with the assembly for the respective 3-D surface measurement of the elongate cut-out; and (S2) three-dimensionally scanning the surface of the elongate cut-out by means of linearly guiding the 3-D measuring head along the longitudinal axis of the elongate cut-out.

As another example, some embodiments may include a method for three-dimensionally sensing elongate cut-outs, in particular grooves, in particular rotor grooves, characterized by (S0, S1) positioning and fixing an assembly on an elongate cut-out of a body, in particular a rotor, wherein a 3-D measuring head is connected to the assembly and is aligned with the elongate cut-out for the respective 3-D surface measurement; (S2) three-dimensionally scanning the surface of the elongate cut-out by means of linearly guiding the 3-D measuring head along the longitudinal axis of the elongate cut-out.

In some embodiments, the processing and 3-D reconstruction (S3) of the 3-D data is generated by means of the 3-D measuring head to form a 3-D model of the elongate cut-out, performed by means of a computer device.

In some embodiments, the method includes analysis (S4) of the 3-D measured data by means of comparing the 3-D model with a CAD model of the elongate cut-out, performed by means of the computer device.

In some embodiments, the method includes display of models of the elongate cut-out, performed by means of the computer device.

In some embodiments, the method includes detaching the assembly (S5) together with the 3-D measuring head from the groove and positioning and fixing on a further elongate cut-out.

BRIEF DESCRIPTION OF THE DRAWINGS

Various embodiments of the teachings herein are described in more detail in conjunction with the figures, in which.

DETAILED DESCRIPTION

Figure 1:
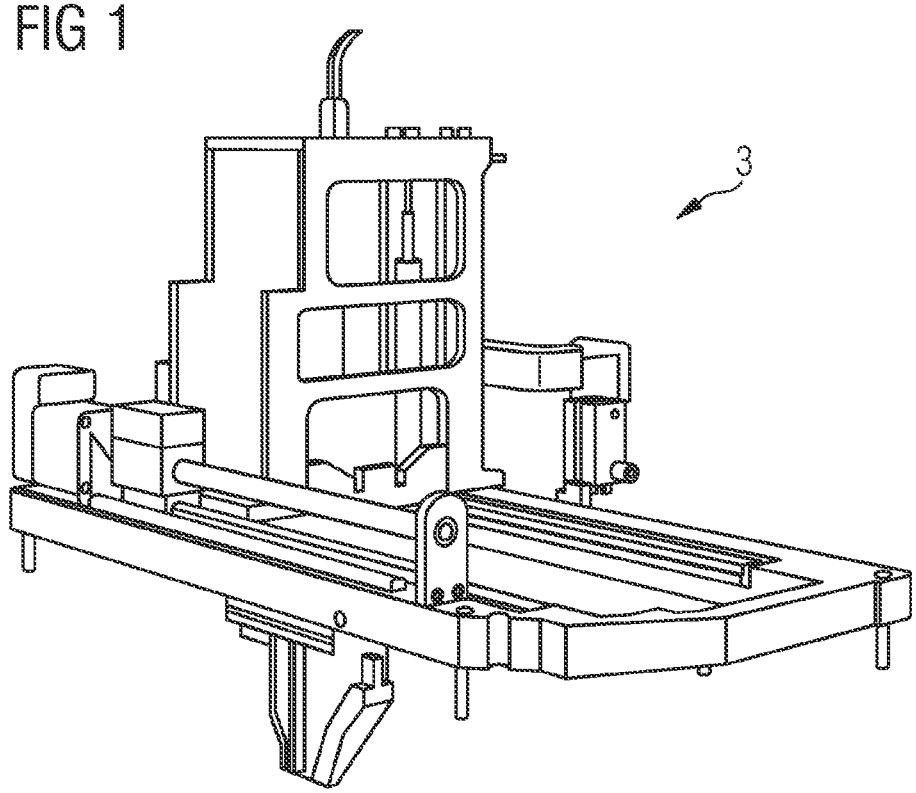
FIG. 1 shows a possible configuration of the 3-D measuring head as that of a so-called multidirectional single-chip triangulation system, incorporating the teachings herein.

In some embodiments, a 3-D measuring device for three-dimensionally sensing elongate cut-outs, in particular grooves, in particular rotor grooves, includes an assembly for positioning and fixing on a groove of a body, in particular of a rotor, and a 3-D measuring head that can be connected to the assembly and aligned with the groove for the respective 3-D surface measurement of the groove are used.

In some embodiments, a method for three-dimensionally sensing elongate cut-outs, in particular grooves, in particular rotor grooves, is proposed, includes positioning and fixing an assembly on a groove of a body, in particular of a rotor, wherein a 3-D measuring head is connected to the assembly and is aligned with the groove for the respective 3-D surface measurement, and three-dimensional scanning of the surface of the groove by linearly guiding the 3-D measuring head along the longitudinal axis of the groove are performed.

In some embodiments, the 3-D measuring device for measuring elongate cut-outs, in particular grooves, for example of gas turbines, is based on a combination of a 3-D scanning head, which can likewise be designated as a 3-D measuring head, with an assembly, which likewise can be designated as a tool platform. In some embodiments, a measuring operation can be performed quickly in an automated manner; for example it is possible for a groove to be measured within one minute. Furthermore, the measurement of a complete groove surface along the complete groove length can be performed. Highly accurate measurement, in particular in a range up to 20 μm, is possible. Wear and deformation of elongate cut-outs, in particular grooves, can be digitized and simply documented.

In some embodiments, a computer device executes the processing and 3-D reconstruction of the 3-D data of the groove generated by means of the 3-D measuring head to form a 3-D model of the groove. In some embodiments, the computer device performs analysis of the 3-D measured data by means of comparing the 3-D model with a computer-admitted-design model of the groove.

In some embodiments, positioning and fixing of an assembly on a groove of a body, in particular a rotor, connection and alignment of a 3-D measuring head on the assembly with the respective 3-D surface measurement of the groove, and three-dimensional scanning of the surface of the groove can be performed by means of linearly guiding the 3-D measuring head along the longitudinal axis of the groove.

In some embodiments, processing and 3-D reconstruction of the 3-D data generated by means of the 3-D measuring head to form a 3-D model of the groove can be performed by means of a computer device. In some embodiments, an analysis of the 3-D measured data by means of comparing the 3-D model with a CAD model of the groove can be performed by means of the computer device. In some embodiments, a display of models of the groove, in particular on a monitor, can be performed by means of the computer device.

In some embodiments, the detachment of the assembly together with the 3-D measuring head from the groove and positioning and fixing to a further groove can be performed.

FIG. 1 shows an example embodiment of a 3-D measuring head 3 incorporating teachings of the present disclosure. Here, the 3-D measuring head 3, which can likewise be designated as a 3-D scanning head, is equipped with a linear guide. FIG. 1 shows the 3-D measuring head 3 for the 3-D measurement, carried out by means of triangulation, of an object in particular having a cut-out, in particular a groove, a gap or a tube, wherein an optical device generating a multiplicity of separate optical paths is positioned between a single sensor device and the object, dividing a single original field of view of the sensor device without any optical device into a plurality of partial fields of view, and the single sensing device sensing the partial fields of view separately.

A cut-out is in particular a three-dimensional region of a material body in which there is no material of the body. The 3-D measuring head 3 can be described as a "multi-directional single chip triangulation system" or as an "optical 3-D measuring probe". The triangulation can be in particular active triangulation which, for example, uses laser line deformations for calculation. For active triangulation, at least one projection device which, in each partial field view, generates a pattern which can be projected onto the object, can be formed. For passive triangulation, for each partial field of view a stereo system, by means of which the object can respectively be sensed, can be formed in the single sensing device.

Figure 2:
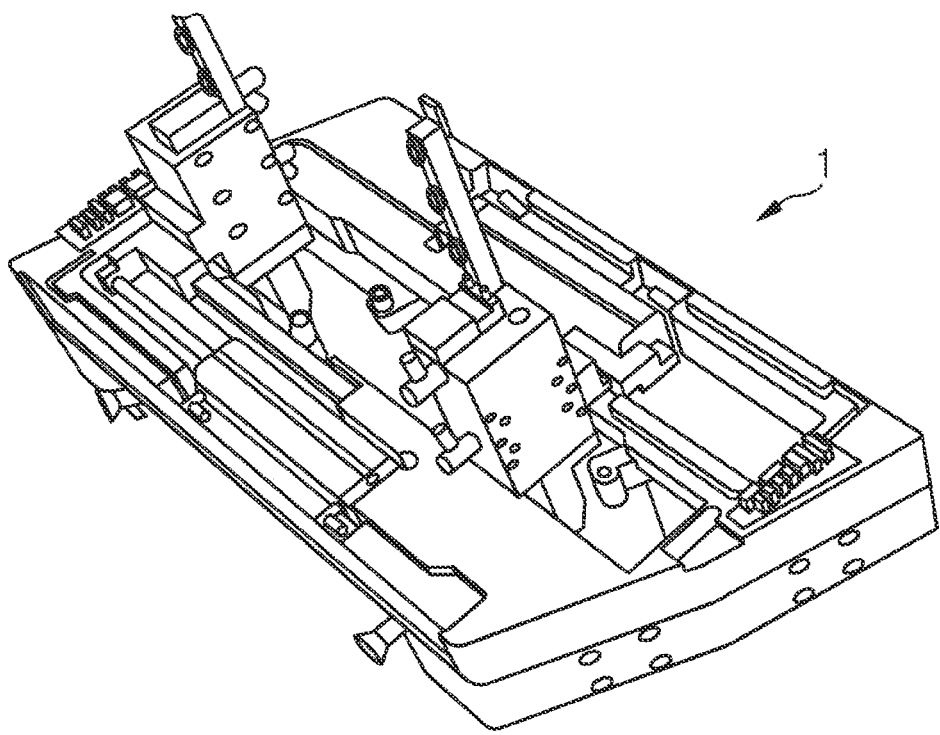
FIG. 2 shows a configuration of a tool platform, incorporating the teachings herein.

FIG. 2 shows an example embodiment of an assembly 1 incorporating the teachings of the present disclosure, which can likewise be described as a tool platform. The assembly is suitable to receive a 3-D measuring head 3 according to FIG. 1. In some embodiments, an assembly for positioning and fixing a tool that can be fixed to the assembly on a cut-out, in particular a groove, in particular of a rotor, extending three-dimensionally along a first longitudinal axis, in particular having an opening angle and four end surfaces at two ends, includes a plate extending three-dimensionally along a second longitudinal axis and a recess which can be aligned with the latter parallel to the first longitudinal axis and frames the elongate cut-out, which is firmly connected to a centering device and a clamping device, wherein the centering device has at least one centering jaw. The latter is, for example, a wedge replicating an opening angle of the elongate cut-out in a cross section relative to the second longitudinal axis, which can be moved in the cut-out along the second longitudinal axis and, for example perpendicular to the plate, into and out of the elongate cut-out, in particular groove, wherein the clamping device has, on the side of the plate that faces the elongate cut-out, clamping jaws which can each be moved along the second longitudinal axis and can be contacted mechanically and detachably fixed to one of the in particular four end surfaces of the two ends of the elongate cut-out.

A recess is in particular a three-dimensional region of a material body in which there is no material of the body. The recess can also be produced as a continuous opening.

In a cross section relative to the second longitudinal axis, the centering jaw(s) can extend physically beyond the course of the elongate cut-out in a cross section relative to the first longitudinal axis and can be clamped into the elongate cut-out. The centering jaws can taper in cross section in the direction toward the elongate cut-out. It is possible, for example, to devise two centering jaws producing wedges corresponding to an opening angle of the elongate cut-out and four clamping jaws.

A processing assembly for elongate cut-outs, in particular grooves, in particular gas turbine rotor grooves, may include a mechanical base for the use of various tools. This processing structure may have one centering device and one clamping device.

Figure 3:
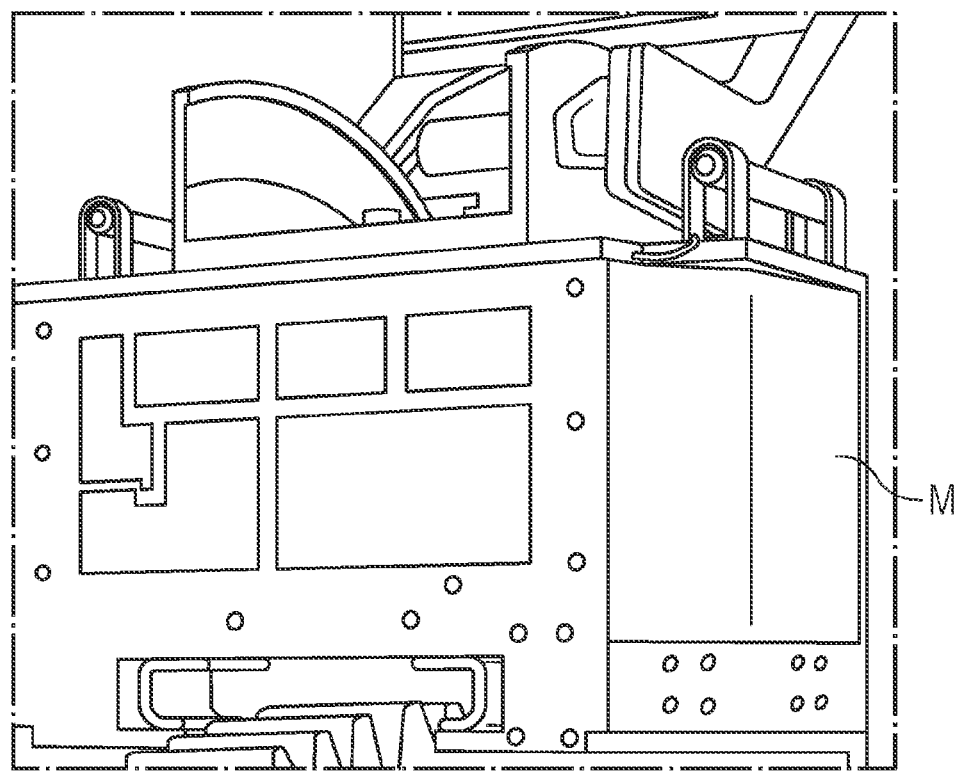
FIG. 3 shows an exemplary embodiment of a 3-D measuring device, incorporating the teachings herein.

FIG. 3 shows an example embodiment of a 3-D measuring device M incorporating teachings of the present disclosure. FIG. 3 shows a complete scanner. Here, a 3-D measuring head 3 according to FIG. 1 is connected to an assembly 1 according to FIG. 2.

Figure 4:
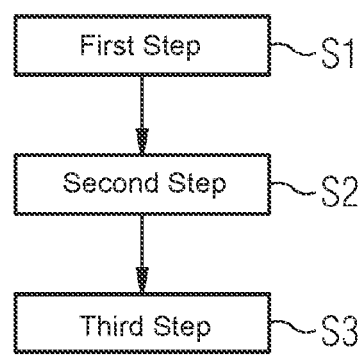
FIG. 4 shows an exemplary embodiment of a method, incorporating the teachings herein.

FIG. 4 shows an example embodiment of a method incorporating teachings of the present disclosure. With a first step S1, a 3-D measuring head is linearly movably connected to the assembly in such a way that, in a second step S2, the 3-D measuring head can be moved through the elongate cut-outs, for example the grooves, and measurements can be made. With a third step S3, the measured data produced are assembled by means of appropriate software to form a 3-D model of the sensed groove. In a subordinate step, specific measured variables, for example distances and wear, is determined in this 3-D model. The computer needed for this or the computer device needed for this can be integrated into the overall assembly, in order to be independent of additional hardware. The computer device may include a processor unit and a storage device for storing 3-D models.

Figure 5:
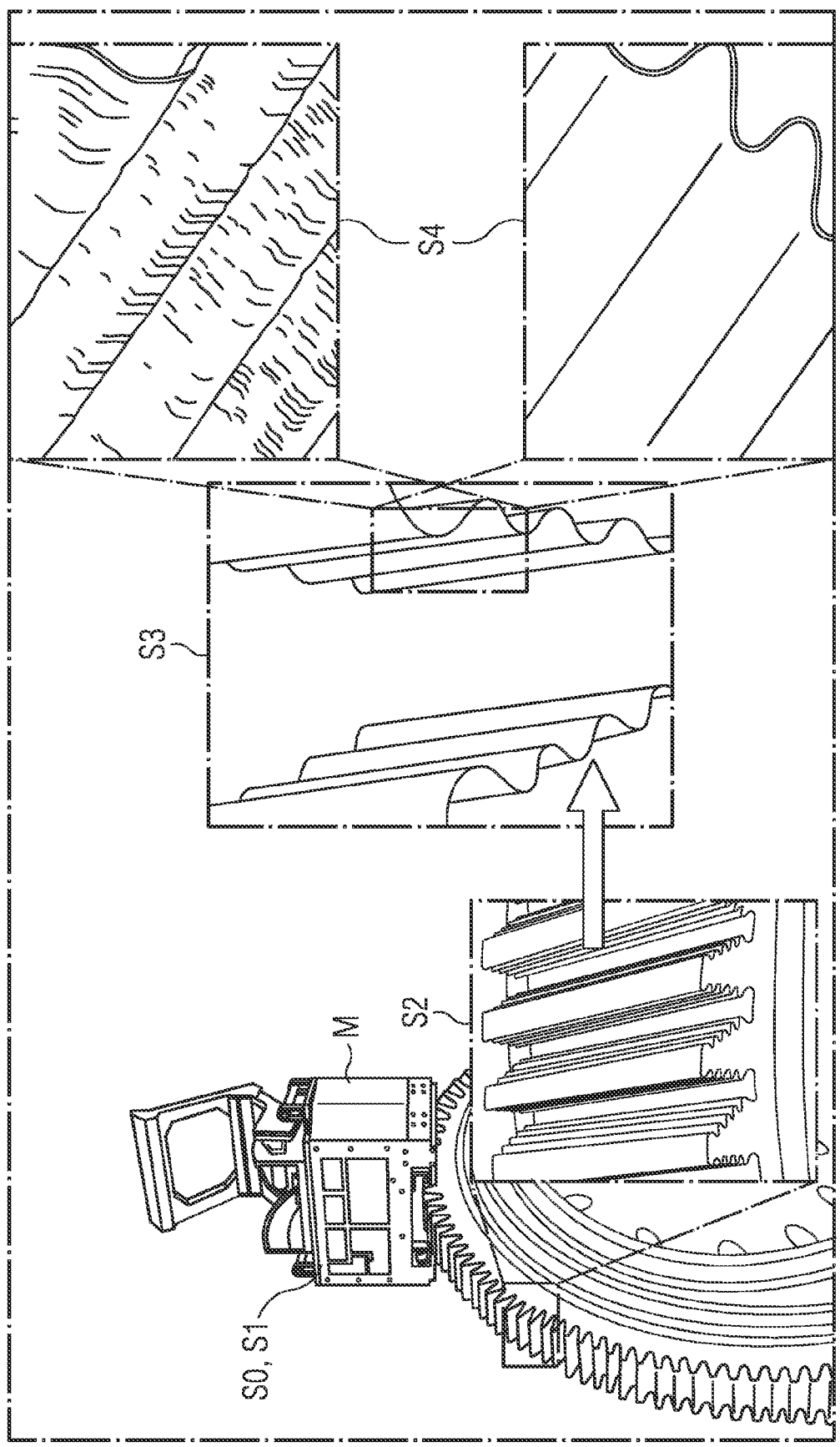
FIG. 5 shows an illustration relating to a further exemplary embodiment of a method, incorporating the teachings herein.

FIG. 5 shows an illustration relating to a further example embodiment of a method incorporating the teachings of the present disclosure. The first two steps S1 and S2 are likewise carried out according to FIG. 4, a step S0 of positioning and fixing the assembly to an elongate cut-out, in particular a groove of a body, here a gas turbine rotor, having previously been performed. Steps S0 and S1 can be performed simultaneously if the assembly 1 together with the 3-D measuring head 3 in the configuration of the 3-D measuring device M according to the invention is positioned and fixed on the groove or on the body having the groove.

FIG. 5 represents the second step S2 of the three-dimensional scanning of the surface of the groove by means of linearly guiding the 3-D measuring head along the longitudinal axis of the groove. FIG. 5 illustrates the further operations, processing and 3-D reconstruction of the 3-D data generated by means of the 3-D measuring head to form a 3-D model of the groove, performed by means of a computer device, being indicated as step S3. FIG. 5 also shows that, by means of the computer device, an analysis of the 3-D measured data is performed in a step S4, in particular by means of comparing the 3-D model with a CAD model of the groove. Here, an ideal groove profile is illustrated as distinct from a profile of a worn groove with an impaired surface. FIG. 5 shows the operations S0 to S4 of a laser-based complete 3-D contour measurement of gas turbine rotor grooves for the analysis of stress of elongate cut-outs, in particular grooves. It is possible for accuracies to around 20 μm to be effected. FIG. 5 shows a 3-D measuring device M as a mobile and completely autonomous scanning unit having a 3-D scanning head, an integrated computer device for the automatic analysis and data storage.

In some embodiments, after a first step S1 to perform alignment of the 3-D measuring device M within the groove by means of the tool platform, after a second step S2 to perform a linear movement of the 3-D measuring head along the groove for data recording, and after a third step S3 to perform the data evaluation for calculating measured variables, in particular lengths, in a final step to perform detachment of the 3-D measuring device M from the measured groove and repetition of the procedure on the next groove to be measured.

Figure 6:
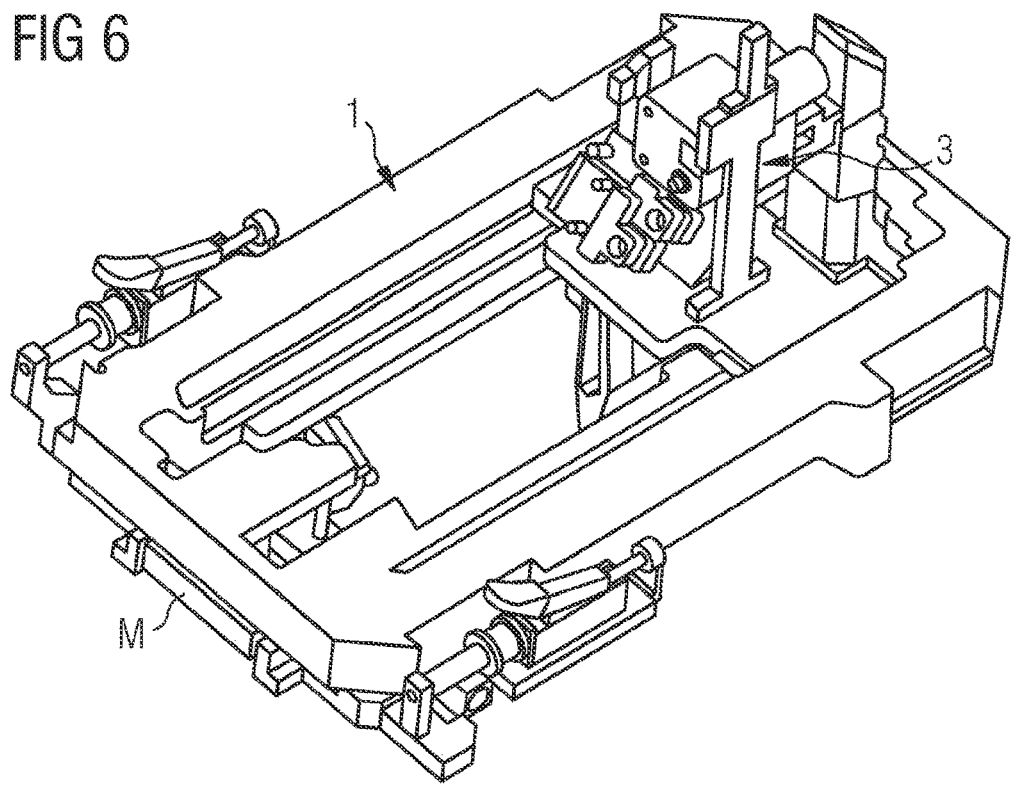
FIG. 6 shows a further exemplary embodiment of a 3-D measuring device, incorporating the teachings herein.

FIG. 6 shows a further example embodiment of a 3-D measuring device M incorporating teachings of the present disclosure. This slight variant of the 3-D measuring device M has no integrated computer device, in addition the assembly 1 together with the 3-D measuring head 3 being operated only by means of purely mechanical components.

Figure 7:
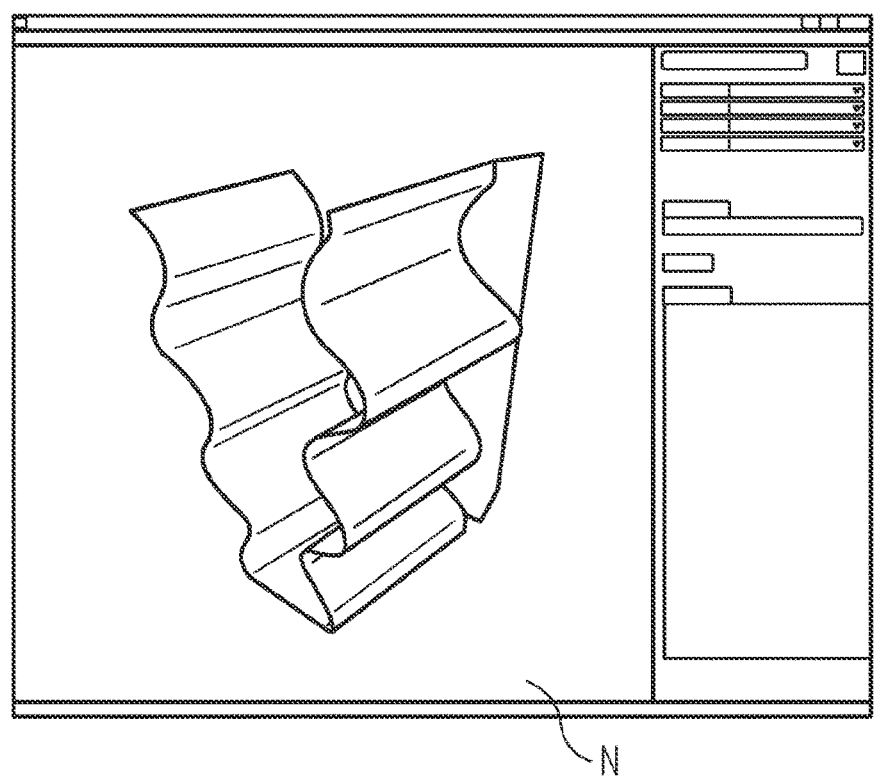
FIG. 7 shows a display of a computer device, incorporating the teachings herein.

FIG. 7 shows a display of a computer device incorporating teachings of the present disclosure. The display shows the representation of a computed 3-D model of an actual elongate cut-out in the configuration of a groove N, which has been scanned and measured following wear.

What is claimed is:

1. A measuring device for three-dimensionally sensing elongate cut-outs, the device comprising:
an assembly for positioning and fixing on an elongate cut-out of a body defining a first longitudinal axis; and
a 3-D measuring head connected to the assembly and movable in relation to the assembly for alignment with the elongate cut-out for the respective 3-D surface measurement of the elongate cut-out;
the assembly including:
a clamping device with clamping jaws, wherein each clamping jaw is configured to detachably connect to an end surface of an end face inside the elongate cut-out;
a plate defining a second cut-out extending along a second longitudinal axis, wherein the second cut-out frames the elongate cut-out when the second longitudinal axis is aligned parallel to the first longitudinal axis;
a centering jaw operable to center the second cut-out in relation to the elongate cut-out.

2. The measuring device as claimed in claim 1, further comprising a computer for processing and 3-D reconstruction of the 3-D data of the elongate cut-out generated by means of the 3-D measuring head;
wherein the computer forms a 3-D model of the elongate cut-out.

3. The measuring device as claimed in claim 2, wherein the computer compares the 3-D model with a CAD model of the elongate cut-out.

4. A method for sensing elongate cut-outs, the method comprising:
positioning and fixing an assembly on an elongate cut-out of a body, the elongate cut-out defining a first longitudinal axis;
connecting and aligning a 3-D measuring head with the assembly for a 3-D surface measurement of the elongate cut-out; and
three-dimensionally scanning the surface of the elongate cut-out by guiding the 3-D measuring head along the longitudinal axis of the elongate cut-out;
wherein the assembly includes: a clamping device with clamping jaws, wherein each clamping jaw is configured to detachably connect to an end surface inside an end face of the elongate cut-out;
a plate defining a second cut-out extending along a second longitudinal axis, wherein the second cut-out frames the elongate cut-out when the second longitudinal axis is aligned parallel to the first longitudinal axis; and
a centering jaw operable to center the second cut-out in relation to the elongate cut-out.

5. The method as claimed in claim 4, further comprising processing and reconstructing the 3-D data generated by means of the 3-D measuring head to form a 3-D model of the elongate cut-out.

6. The method as claimed in claim 5, further comprising analyzing the 3-D measured data by comparing the 3-D model with a CAD model of the elongate cut-out.

7. The method as claimed in claim 6, further comprising displaying models of the elongate cut-out.

8. The method as claimed in claim 4, further comprising detaching the assembly and the 3-D measuring head from the groove and positioning and fixing the assembly on a second elongate cut-out.

* * * * *